(12) United States Patent
Hou et al.

(10) Patent No.: US 12,393,481 B2
(45) Date of Patent: Aug. 19, 2025

(54) DATA ACQUISITION METHOD AND APPARATUS, AND COMPUTER DEVICE

(71) Applicant: Suzhou MetaBrain Intelligent Technology Co., Ltd., Jiangsu (CN)

(72) Inventors: Zhili Hou, Jiangsu (CN); Xiubo Zhang, Jiangsu (CN); Xiangyu Wang, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/875,308

(22) PCT Filed: Jul. 24, 2023

(86) PCT No.: PCT/CN2023/108929
§ 371 (c)(1),
(2) Date: Dec. 16, 2024

(87) PCT Pub. No.: WO2024/119843
PCT Pub. Date: Jun. 13, 2024

(65) Prior Publication Data
US 2025/0173211 A1 May 29, 2025

(30) Foreign Application Priority Data
Dec. 5, 2022 (CN) .......................... 202211551278.9

(51) Int. Cl.
*G06F 11/00* (2006.01)
*G06F 11/07* (2006.01)

(52) U.S. Cl.
CPC ...... *G06F 11/0784* (2013.01); *G06F 11/0709* (2013.01)

(58) Field of Classification Search
CPC ............. G06F 11/0709; G06F 11/0766; G06F 11/0784; H03L 41/06; H03L 41/069
See application file for complete search history.

(56) References Cited

U.S. PATENT DOCUMENTS

| 10,986,174 B1 | 4/2021 | Sharma et al. |
| 2013/0179558 A1* | 7/2013 | Lin .......................... H04L 41/04 709/223 |

(Continued)

FOREIGN PATENT DOCUMENTS

| CN | 104202195 A | 12/2014 |
| CN | 111984498 A | 11/2020 |

(Continued)

OTHER PUBLICATIONS

International Search Report cited in PCT/CN2023/108929, mailed Sep. 27, 2023, 7 pages.

(Continued)

*Primary Examiner* — Marc Duncan
(74) *Attorney, Agent, or Firm* — Cooper Legal Group, LLC

(57) ABSTRACT

A data acquisition method and apparatus and a computer device. The method includes: configuring a server cluster and a network file system server to a target wide area network; broadcasting, by a baseboard management controller, serving as a target baseboard management controller, a link layer discovery protocol data frame to the target wide area network, and receiving, by a baseboard management controller serving as a preset baseboard management controller in the target wide area network except for the target baseboard management controller, the link layer discovery protocol data frame broadcast by the target baseboard management controller, to achieve successful handshake communication of two servers; obtaining a preset data acquisition rule of the baseboard management controller in response to the baseboard management controller reporting an error; and acquiring data of the baseboard management controller based on the preset data acquisition rule through the network file system server.

19 Claims, 5 Drawing Sheets

(56) References Cited

U.S. PATENT DOCUMENTS

| | | | |
|---|---|---|---|
| 2015/0074385 A1 | 3/2015 | Zheng et al. | |
| 2015/0127814 A1 | 5/2015 | Hu et al. | |
| 2021/0334153 A1* | 10/2021 | Chang | G06F 11/0709 |
| 2023/0269126 A1* | 8/2023 | Parthasarathy | G06F 9/5027 |
| | | | 709/223 |
| 2023/0283514 A1* | 9/2023 | Jea | H04L 41/0654 |
| | | | 709/224 |

FOREIGN PATENT DOCUMENTS

| | | |
|---|---|---|
| CN | 113608908 A | 11/2021 |
| CN | 114138524 A | 3/2022 |
| CN | 114442765 A | 5/2022 |
| CN | 114866424 A | 8/2022 |
| CN | 115185675 A | 10/2022 |
| CN | 115562950 A | 1/2023 |

OTHER PUBLICATIONS

Written Opinion cited in PCT/CN2023/108929, mailed Sep. 27, 2023, 6 pages.

First Office Action cited in CN202211551278.9, mailed Jan. 12, 2023, 10 pages.

Notification to Grant Patent Right for Invention cited in CN202211551278.9, mailed Feb. 21, 2023, 4 pages.

\* cited by examiner

DATA ACQUISITION METHOD AND APPARATUS, AND COMPUTER DEVICE

CROSS-REFERENCE TO RELATED APPLICATION

This application claims priority to Chinese Patent Application No. 202211551278.9, entitled "DATA ACQUISITION METHOD AND APPARATUS, AND COMPUTER DEVICE", filed with the China National Intellectual Property Administration on Dec. 5, 2022, which is incorporated herein by reference in its entirety.

FIELD

The present application relates to the technical field of data acquisition, and in particular, to a data acquisition method and apparatus, and a computer device.

BACKGROUND

As a basic management component in a server, a Baseboard Management Controller (BMC) is responsible for key functions such as cooling the server, monitoring and managing components, reporting abnormal states, monitoring and analyzing sensor data, diagnosing server faults, and conducting Intelligent Platform Management Interface (IPMI) services. Therefore, in response to a determination that a BMC in a server fails, the server loses its management and control functions, making effective manual management and relevant fault monitoring impossible. Thus, the stability of the BMC is crucial. However, in the entire server field, the BMC is highly customized by users. This leads to continuous addition of various functions into a firmware program of the BMC. The more functions added, the greater the challenge to maintaining the stability of the entire BMC.

When a fault occurs on site, it needs to be promptly located and resolved. To achieve this, it is necessary to acquire and capture relevant serial port printing information, log record information, register information, and similar data at the time of the BMC fault. Currently, the main solutions for acquiring BMC fault diagnosis data include the following: 1. Providing a one-click log downloading function through an Internet interface, and acquiring and downloading relevant log files in a file system of a baseboard management controller through the Internet interface. 2. In response to a determination that a baseboard management controller sends an abnormal operation signal, connecting a server to which the baseboard management controller belongs to a serial port of the baseboard management controller on site to acquire relevant logs. 3. Remotely logging in a system of a baseboard management controller through the secure shell, viewing relevant files in a file system of the baseboard management controller, and executing relevant commands for debugging, or redirecting serial port data to the secure shell for viewing through a serial port redirection function.

However, the inventor realizes that although the above-mentioned relevant solutions may effectively acquire the baseboard management controller fault diagnostic data, all the above solutions have drawbacks.

The solution of providing a one-click log downloading function through an Internet interface, and acquiring and downloading relevant log files in a file system of a baseboard management controller through the Internet interface has the following drawbacks: 1. A Flash storage space of the BMC is relatively small, so it may not store serial port data with long time and a large data volume, but there are many pieces of important debugging information needing to be analyzed and solved by virtue of serial port data. 2. A web interface relies on the stability of a user authentication system and a restful interface in the BMC, and the two key modules are frequently customized and modified. This may easily lead to an inability to log in the web interface normally. In response to a determination that the web interface may not be logged in normally, one-click log data may not be downloaded normally, and relevant information may not be provided for debugging. 3. The one-click log acquisition function relies on the implementation of the one-click log acquisition function of the BMC. In response to a determination that a file is important, but the one-click log function of the BMC with a running version does not have an ability of downloading the file or acquiring relevant information, key information may not be obtained, namely, this implementation may not achieve the ability of a developer for customized downloading and execution of related commands. 4. The function of downloading one-click logs through the web interface may not achieve large-scale cluster management, namely, debugging information in a BMC on a single server may be acquired. If a batch of machines in a local area network have similar faults, in response to a determination that logs of many machines are acquired, the complexity of operation will increase exponentially. 5. In case of a network fault, on-site automatic acquisition may not be achieved. 6. BMC debugging logs may not be continuously acquired.

The solution of connecting a server to which the baseboard management controller belongs to a serial port of the baseboard management controller on site to acquire relevant logs has the following drawbacks: This method may be operated on site, instead of being remotely operated, and serial ports of many machines are designed to be concealed. At most time, a serial port cable may be plugged after a case cover is opened or the server is moved. In response to a determination that a power outage is triggered during this operation, the fault will not possibly be reproduced, and the best time to capture logs will be missed. In addition, this involves operations such as opening the case cover, a user needs to perform the relevant procedure on site, which prolongs troubleshooting time and increases the risk of security.

The solution of remotely logging in a system of a baseboard management controller through the secure shell, viewing relevant files in a file system of the baseboard management controller, and executing relevant commands for debugging, or redirecting serial port data to the secure shell for viewing through a serial port redirection function has the following drawbacks: This method has boundedness because many users disable the secure shell for security reasons. In this case, acquisition of debugging information may not be achieved.

SUMMARY

According to a first aspect, the present application provides a data acquisition method. The method includes:
   configuring a server cluster and a network file system server to a target wide area network, where a quantity of the server cluster is at least one, and the server cluster includes a service server;
   broadcasting, by a baseboard management controller, serving as a target baseboard management controller, of any service server, a link layer discovery protocol data frame to the target wide area network, and receiving, by a baseboard management controller serving as a preset baseboard management controller in the target wide area network except for the target baseboard management controller, the link layer discovery protocol data frame broadcast by the target baseboard management controller, to achieve successful handshake communication of any two service servers;

obtaining, in response to the baseboard management controller of any service server reporting an error, a preset data acquisition rule of the baseboard management controller that reports the error; and acquiring, based on the preset data acquisition rule through the network file system server, data of the baseboard management controller that reports the error.

In some embodiments, before the configuring a server cluster to a target wide area network, the method further includes: configuring a service server to a target local area network to generate the server cluster, where a quantity of the service server is at least one; and broadcasting, by a baseboard management controller, serving as a target baseboard management controller, of the service server, a link layer discovery protocol data frame to the target local area network, to achieve successful handshake communication of any two service servers.

In some embodiments, after the broadcasting, by a baseboard management controller, serving as a target baseboard management controller, of the service server, a link layer discovery protocol data frame to the target wide area network, the method includes: parsing, by the baseboard management controller, the link layer discovery protocol data frame broadcast by the target baseboard management controller, and obtaining attribute information of the target baseboard management controller, where the attribute information includes: an Internet Protocol (IP) address, a life cycle of the link layer discovery protocol data frame, and last time of receiving the link layer discovery protocol data frame of the target baseboard management controller; and generating a target baseboard management controller attribute information table based on the attribute information of the target baseboard management controller, and storing the target baseboard management controller attribute information table to a preset internal memory file.

In some embodiments, before the generating a target baseboard management controller attribute information table based on the attribute information of the target baseboard management controller, the method further includes: determining, based on the IP address in the attribute information of the target baseboard management controller, whether the preset internal memory file of the baseboard management controller includes an IP address that is consistent with the IP address; in response to the preset internal memory file including an IP address that is consistent with the IP address, updating, to the IP address, the last time of receiving the link layer discovery protocol data frame of the target baseboard management controller; and in response to the preset internal memory file not including an IP address that is consistent with the IP address, adding the attribute information of the target baseboard management controller to the preset internal memory file.

In some embodiments, after the generating a target baseboard management controller attribute information table based on the attribute information of the target baseboard management controller, the method further includes: obtaining, by the baseboard management controller based on an IP address in the preset internal memory file, last time, corresponding to the IP address, of receiving the link layer discovery protocol data frame of the target baseboard management controller; obtaining a time difference between current time and the last time of receiving the link layer discovery protocol data frame of the target baseboard management controller, and determining whether the time difference exceeds a life cycle, corresponding to the IP address, of the link layer discovery protocol data frame; and in response to the time difference exceeding the life cycle, corresponding to the IP address, of the link layer discovery protocol data frame, deleting the target baseboard management controller attribute information table.

In some embodiments, the obtaining, in response to the baseboard management controller of any service server within the target wide area network reporting an error, a preset data acquisition rule of the baseboard management controller that reports the error includes: sending, by the baseboard management controller that reports the error, error information to the baseboard management controller of any service server through the target wide area network and the target local area network; and after receiving the error information, initiating, by the baseboard management controller, a diagnostic data remote-acquisition process, and obtaining the preset data acquisition rule of the baseboard management controller that reports the error.

In some embodiments, the acquiring, based on the preset data acquisition rule through the network file system server, data of the baseboard management controller that reports the error includes: reading the preset data acquisition rule of the baseboard management controller that reports the error from an electrically erasable programmable read-only memory of the baseboard management controller that reports the error; reading a network file system parameter configured to a network file system server of the baseboard management controller that reports the error; and based on the preset data acquisition rule and the network file system parameter of the network file system server through the network file system server, acquiring the data of the baseboard management controller that reports the error.

In some embodiments, the data acquisition rule includes: a data acquisition executive body, a data acquisition manner and a data acquisition mode; the data acquisition executive body includes: a native machine and a cluster; the data acquisition manner includes: remote acquisition and local acquisition; and the data acquisition mode includes: a manual data acquisition mode, a continuous data acquisition mode, an intelligent data acquisition mode, and a control data acquisition mode.

In some embodiments, in response to the preset data acquisition rule in the electrically erasable programmable read-only memory being effective, the acquiring, based on the preset data acquisition rule through the network file system server, data of the baseboard management controller that reports the error includes: determining whether a network state of the target wide area network is normal; and in response to the network state of the target wide area network being normal, acquiring, by using the preset data acquisition rule through the network file system server, the data of the baseboard management controller that reports the error; and in response to the network state of the target wide area network being abnormal, externally connecting a storage device to the baseboard management controller that reports the error, and determining whether the data acquisition manner is the local acquisition.

In some embodiments, the determining whether the data acquisition manner is the local acquisition includes: in response to the data acquisition manner being the local acquisition, determining whether the data acquisition executive body is the native machine; and in response to the data acquisition manner being not the local acquisition, acquiring, by using the data acquisition rule that includes the data acquisition executive body being the native machine, the data acquisition manner being the local acquisition, and the data acquisition mode being the manual data acquisition mode, the data of the baseboard management controller that reports the error.

In some embodiments, the determining whether the data acquisition executive body is the native machine includes: in response to the data acquisition executive body being the native machine, acquiring, by using a preset data acquisition mode, the data of the baseboard management controller that reports the error; and in response to the data acquisition executive body being not the native machine, determining whether a network state of the target local area network is normal.

In some embodiments, the determining whether a network state of the target local area network is normal includes: in response to the network state of the target local area network being normal, acquiring, by using the preset data acquisition mode, the data of the baseboard management controller that reports the error; and in response to the network state of the target local area network being abnormal, obtaining the preset data acquisition mode, and acquiring, by using the data acquisition rule that includes the data acquisition executive body being the native machine, the data acquisition manner being local acquisition, and the data acquisition mode being the preset data acquisition mode, the data of the baseboard management controller that reports the error.

In some embodiments, in response to the preset data acquisition manner being remote acquisition, the method further includes: in response to the data acquisition executive body being the native machine, acquiring, according to the preset data acquisition mode by the baseboard management controller that reports the error, the data of the baseboard management controller that reports the error, and writing the data into the network file system server; and in response to the data acquisition executive body being the cluster, acquiring, by a preset baseboard management controller according to the preset data acquisition mode, the data of the baseboard management controller that reports the error, and writing the data into the network file system server.

In some embodiments, in response to the preset data acquisition manner being local acquisition, the method further includes: in response to the data acquisition executive body being the cluster, acquiring, by a preset baseboard management controller according to the preset data acquisition mode, the data of the baseboard management controller that reports the error, and writing the data into the storage device; and in response to the data acquisition executive body being the native machine, acquiring, by the baseboard management controller that reports the error according to the preset data acquisition mode, the data of the baseboard management controller that reports the error, and writing the data into the storage device.

In some embodiments, in response to the preset data acquisition mode being the manual data acquisition mode, the method includes following steps: Step A1, obtaining a data acquisition execution signal of the baseboard management controller that reports the error; Step A2, after the data acquisition execution signal of the baseboard management controller that reports the error has been obtained, obtaining the network file system parameter of the baseboard management controller that reports the error, and mounting, based on the network file system parameter of the baseboard management controller that reports the error, a path of the network file system server to the baseboard management controller that reports the error; Step A3, outputting serial port data of the baseboard management controller that reports the error to an asynchronous transceiver transmission end; and Step A4, obtaining, based on the asynchronous transceiver transmission end, the serial port data of the baseboard management controller that reports the error, and writing the serial port data into the network file system server.

In some embodiments, in response to the preset data acquisition mode being the continuous data acquisition mode, the method includes: repeatedly executing Step A1 to Step A4, and acquiring the data of the baseboard management controller that reports the error.

In some embodiments, in response to the preset data acquisition mode being the control data acquisition mode, the method includes following steps: Step B1, obtaining a network file system configuration parameter of the baseboard management controller that reports the error; Step B2, mounting, based on the network file system configuration parameter, the network file system server to the baseboard management controller that reports the error; Step B3, determining whether a data acquisition execution instruction has been successfully received, where the execution instruction includes a data acquisition execution instruction sent by an IPM1, and a data acquisition execution instruction stored in the network file system server mounted to the baseboard management controller that reports the error; and Step B4, in response to the data acquisition execution instruction having been successfully received, executing the data acquisition execution instruction to generate an execution result, and writing the execution result into the network file system server, where the execution result includes an execution success and an execution failure.

In some embodiments, in response to the preset data acquisition mode being the intelligent data acquisition mode, the method includes: Step C1, reading a network file system configuration parameter of the baseboard management controller that reports the error; Step C2, mounting, based on the network file system configuration parameter of the baseboard management controller that reports the error, a corresponding catalog of the network file system server to the baseboard management controller that reports the error; Step C3, acquiring serial port data of the baseboard management controller that reports the error, and parsing the serial port data of the baseboard management controller that reports the error; Step C4, determining whether an abnormal operation state of the baseboard management controller that reports the error is true, and executing Step C5 in response to the abnormal operation state of the baseboard management controller that reports the error being true; and Step C5, saving the serial port data of the baseboard management controller that reports the error into a file corresponding to a mounting catalog configured in the network file system.

In some embodiments, the determining whether an abnormal operation state of the baseboard management controller that reports the error is true includes: in response to the abnormal operation state of the baseboard management controller that reports the error being false, executing Step C6; and Step C6, determining whether the baseboard management controller that reports the error has a process thread having a data acquisition demand.

In some embodiments, the determining whether the baseboard management controller that reports the error has a process thread having a data acquisition demand includes: in response to the baseboard management controller that reports the error not having a process thread with the data acquisition demand, executing Step C7; otherwise, executing Step C5; and Step C7, discarding the serial port data of the baseboard management controller that reports the error.

In some embodiments, the method includes: generating a list of preset baseboard management controllers in advance; and the generating a list of preset baseboard management controllers in advance includes: generating a set of preset baseboard management controllers based on any target baseboard management controller, where the set of preset baseboard management controllers includes at least one baseboard management controller in the target wide area network except for the target baseboard management controller, and each baseboard management controller is defined as the preset baseboard management controller; and performing priority ranking on the preset baseboard management controllers in the set of preset baseboard management controllers, and generating the list of preset baseboard management controllers according to priorities from high to low.

In some embodiments, the acquiring, based on the preset data acquisition rule through the network file system server, data of the baseboard management controller that reports the error includes: traversing the list of preset baseboard management controllers; and selecting, according to a priority sequence of the preset baseboard management controllers, one preset baseboard management controller to acquire, based on the preset data acquisition rule of the baseboard management controller that reports the error through the network file system server, the data of the baseboard management controller that reports the error.

In some embodiments, the acquiring, based on the preset data acquisition rule through the network file system server, data of the baseboard management controller that reports the error further includes: in response to the data acquisition executive body being the cluster and the data acquisition mode being the continuous data acquisition mode, obtaining, by a preset baseboard management controller in the set of preset baseboard management controllers, a serial port resource occupancy rate of any preset baseboard management controller within the target wide area network except for the baseboard management controller that reports the error; and selecting a preset baseboard management controller with the smallest serial port resource occupancy rate to acquire, according to the continuous data acquisition mode, the data of the baseboard management controller that reports the error.

In some embodiments, the serial port data of the baseboard management controller that reports the error includes: a configuration partition, a log partition, an internal memory partition, a network routing parameter, a kernel resource parameter, resource occupancy information, and process thread operation information.

According to another aspect, the present application provides a data acquisition apparatus. The apparatus includes:
a configuration unit, configured for configuring a server cluster and a network file system server to a target wide area network, where a quantity of the server cluster is at least one, and the server cluster includes a service server; and further configured for: broadcasting, by a baseboard management controller, serving as a target baseboard management controller, of any service server, a link layer discovery protocol data frame to the target wide area network, and receiving, by a baseboard management controller serving as a preset baseboard management controller in the target wide area network except for the target baseboard management controller, the link layer discovery protocol data frame broadcast by the target baseboard management controller, to achieve successful handshake communication of any two service servers;
an obtaining unit, configured for obtaining, in response to the baseboard management controller of any service server reporting an error, a preset data acquisition rule of the baseboard management controller that reports the error; and
an acquisition unit, configured for acquiring, based on the preset data acquisition rule through the network file system server, data of the baseboard management controller that reports the error.

According to still another aspect, the present application provides a computer device, including one or more memories, one or more processors, and computer-readable instructions stored on the one or more memories and executable on the one or more processors. The one or more processors, when executing the computer-readable instructions, implement steps in the data acquisition method provided by any of the above embodiments.

According to yet another aspect, the present application provides a computer-readable storage medium, having computer-readable instructions stored thereon. The computer-readable instructions, when executed by one or more processors, implement steps in the data acquisition method provided by any of the above embodiments.

DETAILED DESCRIPTION

Figure 1:
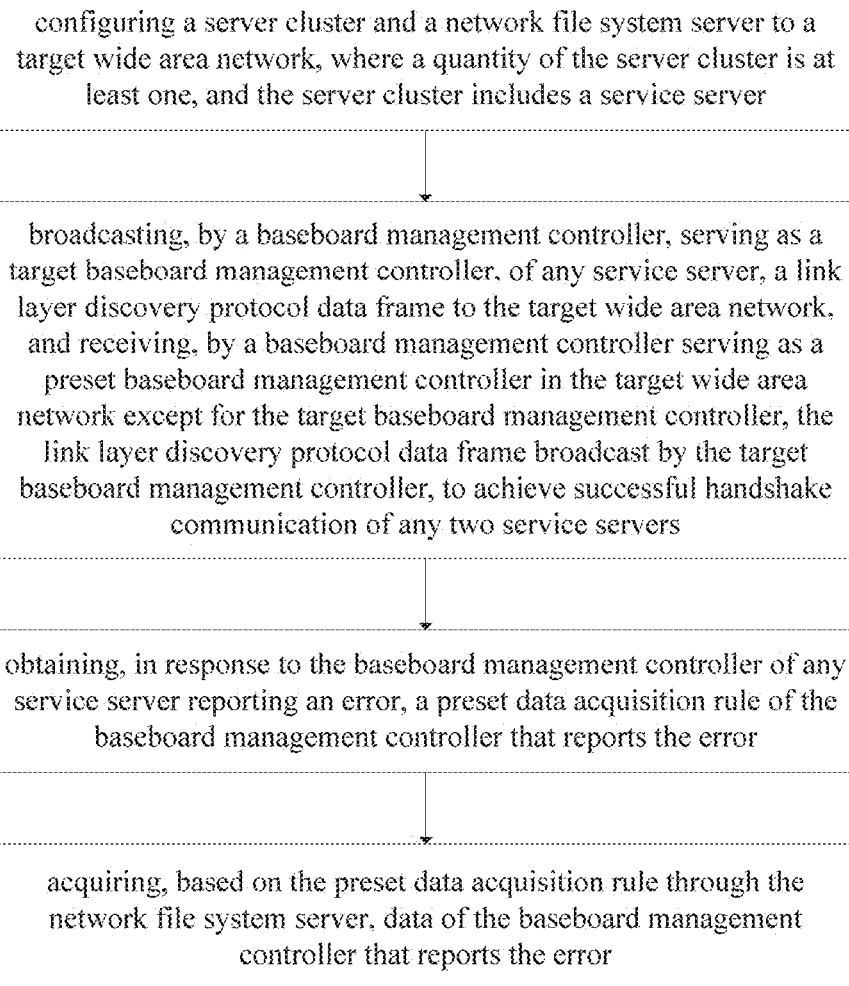
FIG. 1 is a flowchart of a data acquisition method in one or more embodiments of the present application.

To make the objectives, technical solutions, and advantages of the present application clearer, the following is a further detailed explanation of the present application in conjunction with the accompanying drawings and embodiments. It should be understood that the embodiments described here are intended to explain the present application and are not intended to limit the present application.

In some embodiments, the present application provides a data acquisition method. The method includes following steps:
configuring a server cluster and a network file system server to a target wide area network, where a quantity of the server cluster is at least one, and the server cluster includes a service server;
broadcasting, by a baseboard management controller, serving as a target baseboard management controller, of any service server, a link layer discovery protocol data frame to the target wide area network, and receiving, by a baseboard management controller serving as a preset baseboard management controller in the target wide area network except for the target baseboard management controller, the link layer discovery protocol data frame broadcast by the target baseboard management controller, to achieve successful handshake communication of any two service servers;

obtaining, in response to the baseboard management controller of any service server reporting an error, a preset data acquisition rule of the baseboard management controller; and acquiring, based on the preset data acquisition rule through the network file system server, data of the baseboard management controller that reports the error.

In some embodiments, the data acquisition method includes: after a service server is powered on, a baseboard management controller of the service server loads a Universal Boot Loader (Uboot) and a Kernel and file system; then initiating, by the baseboard management controller of the service server serving as a target baseboard management controller, a link layer discovery protocol service and a diagnostic data remote-acquisition process; receiving, by a link layer discovery protocol service server of the baseboard management controller receives, a link layer discovery protocol data frame sent by a baseboard management controller of another service server in a target wide area network, and obtaining attribute information of the target baseboard management controller; and generating a target baseboard management controller attribute information table based on the attribute information of the target baseboard management controller, and storing the target baseboard management controller attribute information table to a preset internal memory file. The link layer discovery protocol data frame carries the attribute information of the target baseboard management controller. The attribute information includes: an IP address, a life cycle of the link layer discovery protocol data frame, and last time of receiving the link layer discovery protocol data frame of the target baseboard management controller.

In some embodiments, before the generating a target baseboard management controller attribute information table based on the attribute information of the target baseboard management controller, the method further includes: determining, based on the IP address in the attribute information of the target baseboard management controller, whether the preset internal memory file of the baseboard management controller includes an IP address that is consistent with the IP address; in response to the preset internal memory file including an IP address that is consistent with the IP address, updating, to the IP address, the last time of receiving the link layer discovery protocol data frame of the target baseboard management controller; and in response to the preset internal memory file not including an IP address that is consistent with the IP address, adding the attribute information of the target baseboard management controller to the preset internal memory file.

In some embodiments, after the generating a target baseboard management controller attribute information table based on the attribute information of the target baseboard management controller, the method further includes: obtaining, by the baseboard management controller based on an IP address in the preset internal memory file, last time, corresponding to the IP address, of receiving the link layer discovery protocol data frame of the target baseboard management controller; obtaining a time difference between current time and the last time of receiving the link layer discovery protocol data frame of the target baseboard management controller, and determining whether the time difference exceeds a life cycle, corresponding to the IP address, of the link layer discovery protocol data frame; and in response to the time difference exceeding the life cycle, corresponding to the IP address, of the link layer discovery protocol data frame, deleting the target baseboard management controller attribute information table.

In some embodiments, in response to the baseboard management controller of any service server reporting an error, a preset data acquisition rule of the baseboard management controller that reports the error is obtained; and data of the baseboard management controller that reports the error is acquired based on the preset data acquisition rule through a network file system server.

In some embodiments, the data acquisition rule includes: a data acquisition executive body, a data acquisition manner and a data acquisition mode; the data acquisition executive body includes: a native machine and a cluster; the data acquisition manner includes: remote acquisition and local acquisition; and the data acquisition mode includes: a manual data acquisition mode, a continuous data acquisition mode, an intelligent data acquisition mode, and a control data acquisition mode. Namely, the data acquisition rule is classified into two categories: a remote data acquisition manner and a local data acquisition manner. The remote data acquisition manner may be classified into two types: a native-machine-based remote data acquisition manner and a cluster-based remote data acquisition manner. The local data acquisition manner may be classified into two types: a native-machine-based local data acquisition manner and a cluster-based local data acquisition manner. The native-machine-based remote data acquisition manner may be classified into four types: a native-machine-based remote manual data acquisition mode, a native-machine-based remote continuous data acquisition mode, a native-machine-based remote intelligent data acquisition mode, and a native-machine-based remote control data acquisition mode. The cluster-based remote data acquisition manner may be classified into four types: a cluster-based remote manual data acquisition mode, a cluster-based remote continuous data acquisition mode, a cluster-based remote intelligent data acquisition mode, and a cluster-based remote control data acquisition mode. The native-machine-based local data acquisition manner may be classified into four types: a native-machine-based local manual data acquisition mode, a native-machine-based local continuous data acquisition mode, a native-machine-based local intelligent data acquisition mode, and a native-machine-based local control data acquisition mode. The cluster-based local data acquisition manner may be classified into four types: a cluster-based local manual data acquisition mode, a cluster-based local continuous data acquisition mode, a cluster-based local intelligent data acquisition mode, and a cluster-based local control data acquisition mode. In summary, there are totally sixteenth data acquisition rules, including: the native-machine-based remote manual data acquisition mode, the native-machine-based remote continuous data acquisition mode, the native-machine-based remote intelligent data acquisition mode, the native-machine-based remote control data acquisition mode, the cluster-based remote manual data acquisition mode, the cluster-based remote continuous data acquisition mode, the cluster-based remote intelligent data acquisition mode, the cluster-based remote control data acquisition mode, the native-machine-based local manual data acquisition mode, the native-machine-based local continuous data acquisition mode, the native-machine-based local intelligent data acquisition mode, the native-machinebased local control data acquisition mode, the cluster-based local manual data acquisition mode, the cluster-based local continuous data acquisition mode, the cluster-based local intelligent data acquisition mode, and the cluster-based local control data acquisition mode.

The local data acquisition manner is an extended data acquisition manner of the remote data acquisition manner, which is mainly to achieve acquisition of data from a baseboard management controller that reports an error in response to a determination that a network operation state of a target wide area network is abnormal.

The manual data acquisition mode is a normalized idle data acquisition mode, which executes a data acquisition operation after a service server of a native machine issues a command. After the data acquisition is completed, a data acquisition state log is generated, and acquired data is updated to a network file system server. The control data acquisition mode is a normalized idle data acquisition mode. In response to a determination that a remote end (i.e. the network file system server) issues a data acquisition command, a data acquisition operation may be executed, and then, an execution state and return information of the data acquisition command are written into the network file system server. The continuous data acquisition mode is a normalized continuous data acquisition mode remotely acquiring data of a baseboard management controller, including serial port data, log data, system internal memory data, and the like, and continuously updating the above data to the network file system server. The intelligent data acquisition mode is a normalized continuous data acquisition mode. However, in response to a determination that a baseboard management controller of any service server reports an error or a preset fault is triggered, data within a period of time before and after the occurrence of the fault or error may be acquired, and the data is updated to the network file system server. Otherwise, the acquired data will be discarded. It should be understood that in response to a determination that the data acquisition manner is remote acquisition, a baseboard management controller in the target wide area network or the target local area network except for the target baseboard management controller acquires, according to the preset data acquisition mode, the data of the baseboard management controller that reports the error.

In some embodiments, obtaining a preset data acquisition rule of the baseboard management controller that reports the error includes: after a data remote-acquisition process is initiated, reading the preset data acquisition rule of the baseboard management controller that reports the error from an electrically erasable programmable read-only memory of the baseboard management controller that reports the error; in response to the data acquisition rule in the electrically erasable programmable read-only memory being a 0xFF mode and a network state of the target wide area network being normal, using the native-machine-based remote manual data acquisition mode by default, then reading parameters, such as an IP address and a storage path, configured to the network file system server of the baseboard management controller that reports the error; in response to a determination that these parameters are not configured, querying at an interval whether the corresponding parameters have been configured; in response to a determination that the corresponding network file system parameters have been configured, reading the corresponding network file system parameters, and acquiring, according to different preset data acquisition rules, the data of the baseboard management controller that reports the error.

In some embodiments, in response to a determination that the local data acquisition manner is used, the method further includes: lightening corresponding state indicator lamps based on different stages of data acquisition. In some embodiments, in response to data acquisition not starting, the state indicator lamps are set to be off states. In response to a need for data acquisition, but data acquisition being not performed, a flashing frequency of the state indicator lamps is set to 1 Hz. In response to start of data acquisition, the flashing frequency of the state indicator lamps is set to 10 Hz. In response to a fault during data acquisition, a color of the state indicator lamps is set to be red and the flashing frequency is normally on. In response to completion of data acquisition, the state indicator lamps are turned off.

In some embodiments, as shown in FIG. 1, the present application provides a data acquisition method. The method includes following steps:

configuring a server cluster and a network file system server to a target wide area network, where a quantity of the server cluster is at least one, and the server cluster includes a service server;

broadcasting, by a baseboard management controller, serving as a target baseboard management controller, of any service server, a link layer discovery protocol data frame to the target wide area network, and receiving, by a baseboard management controller serving as a preset baseboard management controller in the target wide area network except for the target baseboard management controller, the link layer discovery protocol data frame broadcast by the target baseboard management controller, to achieve successful handshake communication of any two service servers;

obtaining, in response to the baseboard management controller of any service server reporting an error, a preset data acquisition rule of the baseboard management controller that reports the error; and acquiring, based on the preset data acquisition rule through the network file system server, data of the baseboard management controller that reports the error.

In some embodiments, before the configuring a server cluster to a target wide area network, the method further includes: configuring a service server to a target local area network to generate the server cluster, where a quantity of the service server is at least one; and broadcasting, by a baseboard management controller, serving as a target baseboard management controller, of the service server, a link layer discovery protocol data frame to the target local area network, to achieve successful handshake communication of any two service servers.

In some embodiments, after the broadcasting, by a baseboard management controller, serving as a target baseboard management controller, of the service server, a link layer discovery protocol data frame to the target wide area network, the method includes: parsing, by the baseboard management controller, the link layer discovery protocol data frame broadcast by the target baseboard management controller, and obtaining attribute information of the target baseboard management controller, where the attribute information includes: an IP address, a life cycle of the link layer discovery protocol data frame, and last time of receiving the link layer discovery protocol data frame of the target baseboard management controller; and generating a target baseboard management controller attribute information table based on the attribute information of the target baseboard management controller, and storing the target baseboard management controller attribute information table to a preset internal memory file.

In some embodiments, before the generating a target baseboard management controller attribute information table based on the attribute information of the target baseboard management controller, the method further includes: determining, based on the IP address in the attribute information of the target baseboard management controller, whether the preset internal memory file of the baseboard management controller includes an IP address that is consistent with the IP address; and in response to the preset internal memory file including an IP address that is consistent with the IP address, updating, to the IP address, the last time of receiving the link layer discovery protocol data frame of the target baseboard management controller; and in response to the preset internal memory file not including an IP address that is consistent with the IP address, adding the attribute information of the target baseboard management controller to the preset internal memory file.

In some embodiments, after the generating a target baseboard management controller attribute information table based on the attribute information of the target baseboard management controller, the method further includes: obtaining, by the baseboard management controller based on an IP address in the preset internal memory file, last time, corresponding to the IP address, of receiving the link layer discovery protocol data frame of the target baseboard management controller; obtaining a time difference between current time and the last time of receiving the link layer discovery protocol data frame of the target baseboard management controller, and determining whether the time difference exceeds a life cycle, corresponding to the IP address, of the link layer discovery protocol data frame; and in response to the time difference exceeding the life cycle, corresponding to the IP address, of the link layer discovery protocol data frame, deleting the target baseboard management controller attribute information table.

In some embodiments, the obtaining, in response to the baseboard management controller of any service server within the target wide area network reporting an error, a preset data acquisition rule of the baseboard management controller that reports the error includes: sending, by the baseboard management controller that reports the error, error information to the baseboard management controller of any service server through the target wide area network and the target local area network; and after receiving the error information, initiating, by the baseboard management controller, a diagnostic data remote-acquisition process, and obtaining the preset data acquisition rule of the baseboard management controller that reports the error.

In some embodiments, the acquiring, based on the preset data acquisition rule through the network file system server, data of the baseboard management controller that reports the error includes: reading the preset data acquisition rule of the baseboard management controller that reports the error from an electrically erasable programmable read-only memory of the baseboard management controller that reports the error; reading a network file system parameter configured to a network file system server of the baseboard management controller that reports the error; and based on the preset data acquisition rule and the network file system parameter of the network file system server through the network file system server, acquiring the data of the baseboard management controller that reports the error.

In some embodiments, the data acquisition rule includes: a data acquisition executive body, a data acquisition manner and a data acquisition mode; the data acquisition executive body includes: a native machine and a cluster; the data acquisition manner includes: remote acquisition and local acquisition; and the data acquisition mode includes: a manual data acquisition mode, a continuous data acquisition mode, an intelligent data acquisition mode, and a control data acquisition mode.

In some embodiments, in response to the preset data acquisition rule in the electrically erasable programmable read-only memory being effective, the acquiring, based on the preset data acquisition rule through the network file system server, data of the baseboard management controller that reports the error includes: determining whether a network state of the target wide area network is normal; and in response to the network state of the target wide area network being normal, acquiring, by using the preset data acquisition rule through the network file system server, the data of the baseboard management controller that reports the error; and in response to the network state of the target wide area network being abnormal, externally connecting a storage device to the baseboard management controller that reports the error, and determining whether the data acquisition manner is local acquisition.

In some embodiments, the determining whether the data acquisition manner is the local acquisition includes: in response to the data acquisition manner being the local acquisition, determining whether the data acquisition executive body is the native machine; and in response to the data acquisition manner being not the local acquisition, acquiring, by using the data acquisition rule that includes the data acquisition executive body being the native machine, the data acquisition manner being the local acquisition, and the data acquisition mode being the manual data acquisition mode, the data of the baseboard management controller that reports the error.

In some embodiments, the determining whether the data acquisition executive body is the native machine includes: in response to the data acquisition executive body being the native machine, acquiring, by using a preset data acquisition mode, the data of the baseboard management controller that reports the error; and in response to the data acquisition executive body being not the native machine, determining whether a network state of the target local area network is normal.

In some embodiments, the determining whether a network state of the target local area network is normal includes: in response to the network state of the target local area network being normal, acquiring, by using the preset data acquisition mode, the data of the baseboard management controller that reports the error; and in response to the network state of the target local area network being abnormal, obtaining the preset data acquisition mode, and acquiring, by using the data acquisition rule that includes the data acquisition executive body being the native machine, the data acquisition manner being local acquisition, and the data acquisition mode being the preset data acquisition mode, the data of the baseboard management controller that reports the error.

In some embodiments, in response to the preset data acquisition manner being remote acquisition, the method further includes: in response to the data acquisition executive body being the native machine, acquiring, according to the preset data acquisition mode by the baseboard management controller that reports the error, the data of the baseboard management controller that reports the error, and writing the data into the network file system server; and in response to the data acquisition executive body being the cluster, acquiring, by a preset baseboard management controller according to the preset data acquisition mode, the data of the baseboard management controller that reports the error, and writing the data into the network file system server.

In some embodiments, in response to the preset data acquisition manner being local acquisition, the method further includes: in response to the data acquisition executive body being the cluster, acquiring, by a preset baseboard management controller according to the preset data acquisition mode, the data of the baseboard management controller that reports the error, and writing the data into the storage device; and in response to the data acquisition executive body being the native machine, acquiring, by the baseboard management controller that reports the error according to the preset data acquisition mode, the data of the baseboard management controller that reports the error, and writing the data into the storage device.

Figure 2:
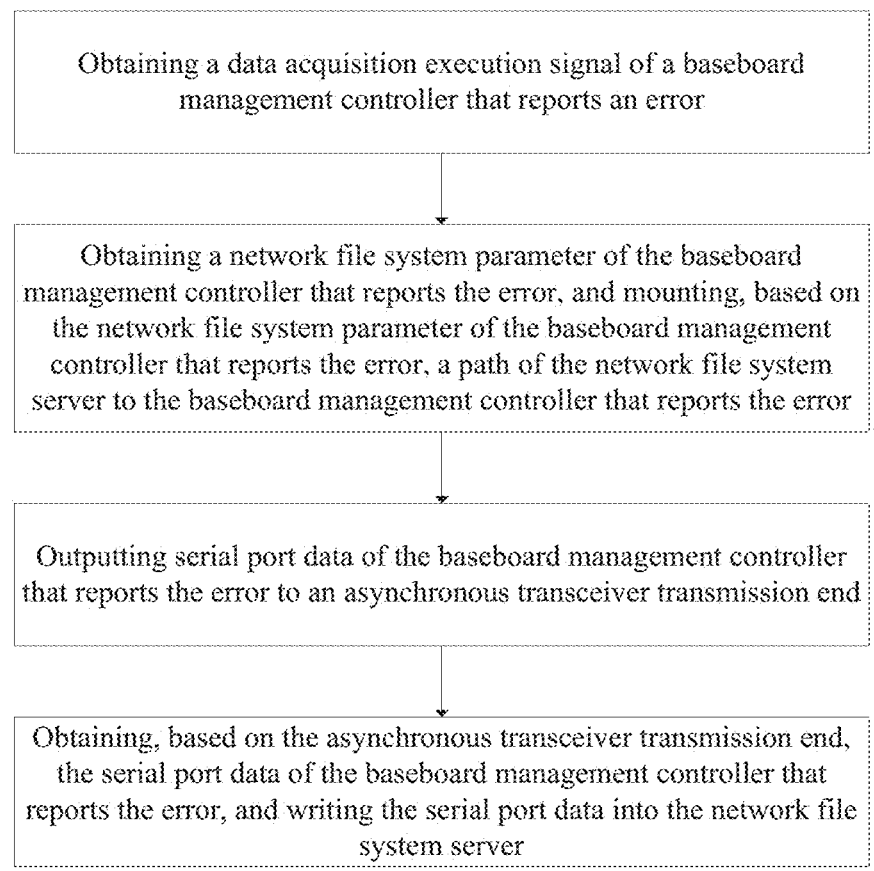
FIG. 2 is a flowchart of data acquisition based on a manual data acquisition mode in one or more embodiments of the present application.

In some embodiments, as shown in FIG. 2, in response to the preset data acquisition mode being the manual data acquisition mode, the method includes following steps: Step A1, obtaining a data acquisition execution signal of the baseboard management controller that reports the error; Step A2, after the data acquisition execution signal of the baseboard management controller that reports the error has been obtained, obtaining the network file system parameter of the baseboard management controller that reports the error, and mounting, based on the network file system parameter of the baseboard management controller that reports the error, a path of the network file system server to the baseboard management controller that reports the error; Step A3, outputting serial port data of the baseboard management controller that reports the error to an asynchronous transceiver transmission end; and Step A4, obtaining, based on the asynchronous transceiver transmission end, the serial port data of the baseboard management controller that reports the error, and writing the serial port data into the network file system server.

In some embodiments, in response to the preset data acquisition mode being the continuous data acquisition mode, the method includes: repeatedly executing Step A1 to Step A4, and acquiring the data of the baseboard management controller that reports the error.

Figure 3:
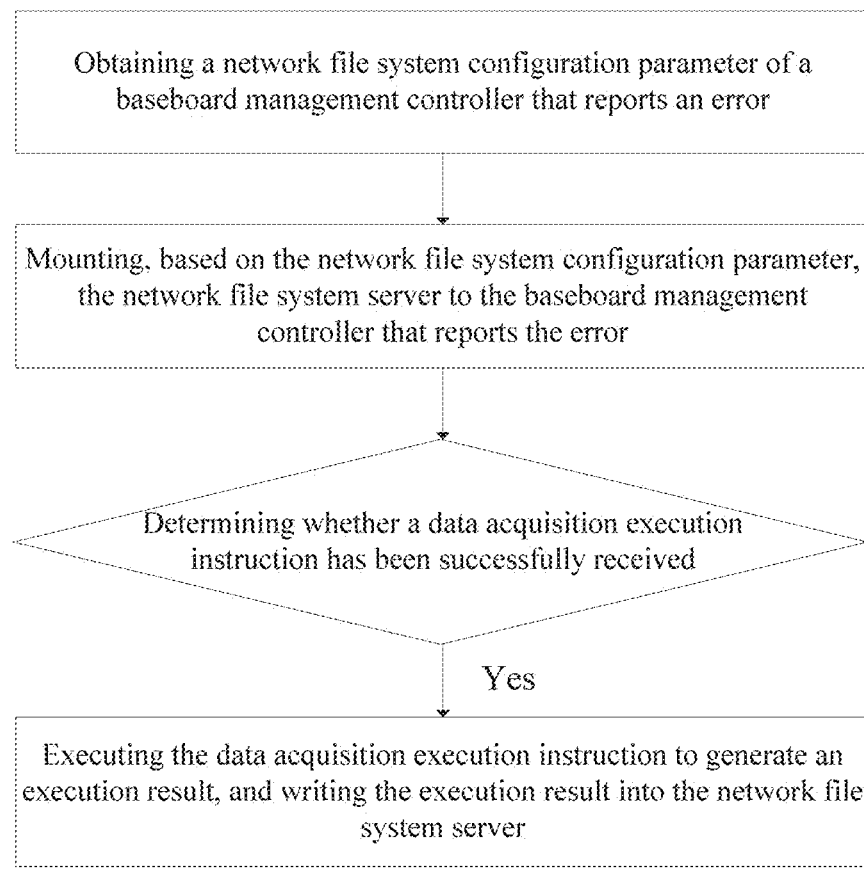
FIG. 3 is a flowchart of data acquisition based on a control data acquisition mode in one or more embodiments of the present application.

In some embodiments, as shown in FIG. 3, in response to the preset data acquisition mode being the control data acquisition mode, the method includes following steps: Step B1, obtaining a network file system configuration parameter of the baseboard management controller that reports the error; Step B2, mounting, based on the network file system configuration parameter, the network file system server to the baseboard management controller that reports the error; Step B3, determining whether a data acquisition execution instruction has been successfully received, where the execution instruction includes a data acquisition execution instruction sent by an Intelligent Platform Management Interface (IPM1), and a data acquisition execution instruction stored in the network file system server mounted to the baseboard management controller that reports the error; and Step B4, in response to the data acquisition execution instruction having been successfully received, executing the data acquisition execution instruction to generate an execution result, and writing the execution result into the network file system server, where the execution result includes an execution success and an execution failure.

Figure 4:
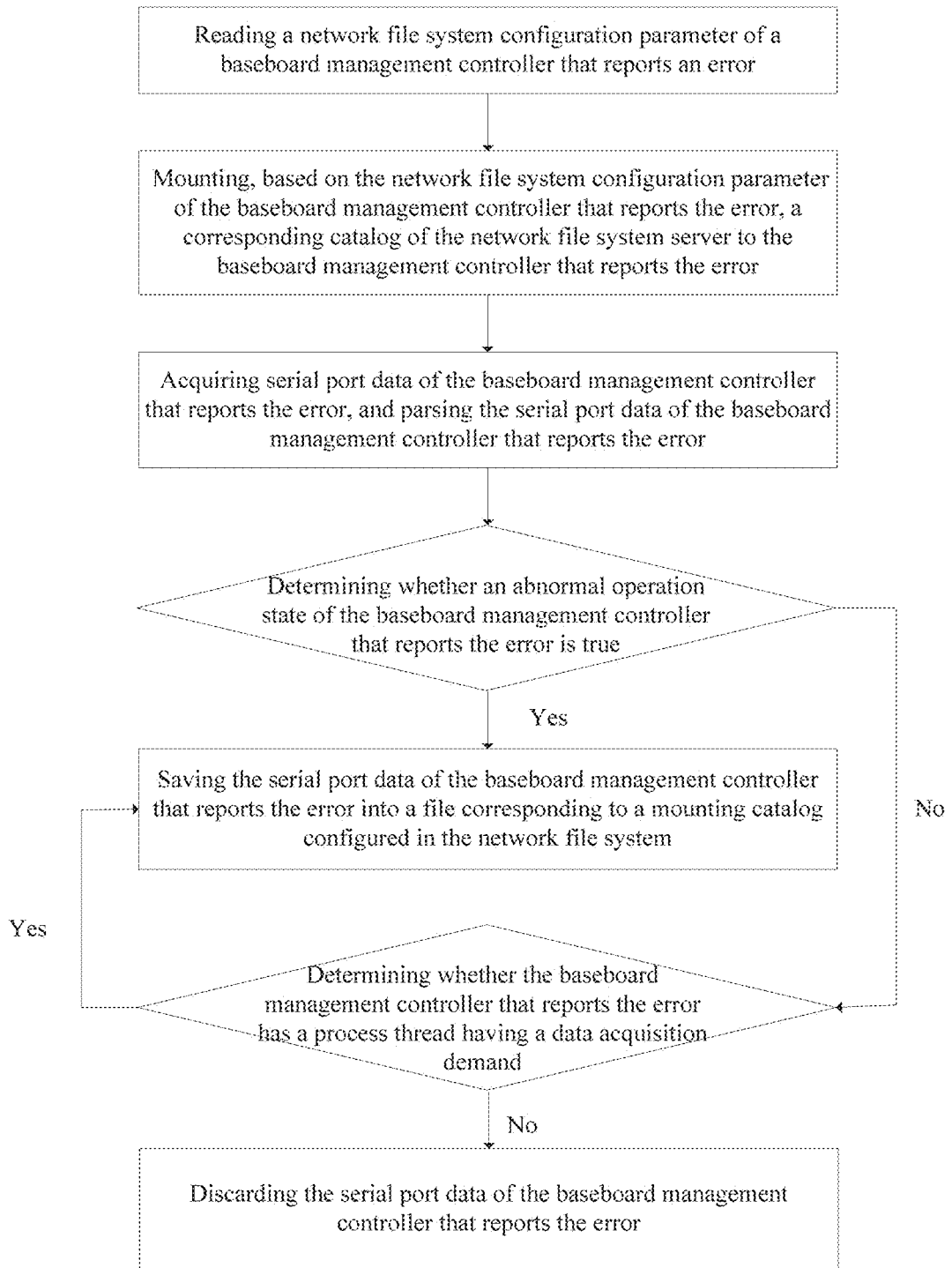
FIG. 4 is a flowchart of data acquisition based on an intelligent data acquisition mode in another embodiment of the present application.

In some embodiments, as shown in FIG. 4, in response to the preset data acquisition mode being the intelligent data acquisition mode, the method includes: Step C1, reading a network file system configuration parameter of the baseboard management controller that reports the error; Step C2, mounting, based on the network file system configuration parameter of the baseboard management controller that reports the error, a corresponding catalog of the network file system server to the baseboard management controller that reports the error; Step C3, acquiring serial port data of the baseboard management controller that reports the error, and parsing the serial port data of the baseboard management controller that reports the error; Step C4, determining whether an abnormal operation state of the baseboard management controller that reports the error is true, and executing Step C5 in response to the abnormal operation state of the baseboard management controller that reports the error being true; and Step C5, saving the serial port data of the baseboard management controller that reports the error into a file corresponding to a mounting catalog configured in the network file system.

In some embodiments, the determining whether an abnormal operation state of the baseboard management controller that reports the error is true includes: in response to the abnormal operation state of the baseboard management controller that reports the error being false, executing Step C6; and Step C6, determining whether the baseboard management controller that reports the error has a process thread with a data acquisition demand.

In some embodiments, the determining whether the baseboard management controller that reports the error has a process thread with a data acquisition demand includes: in response to the baseboard management controller that reports the error not having the process thread with the data acquisition demand, executing Step C7; otherwise, executing Step C5; and Step C7, discarding the serial port data of the baseboard management controller that reports the error.

In some embodiments, the method includes: generating a list of preset baseboard management controllers in advance; and the generating a list of preset baseboard management controllers in advance includes: generating a set of preset baseboard management controllers based on any target baseboard management controller, where the set of preset baseboard management controllers includes at least one baseboard management controller in the target wide area network except for the target baseboard management controller, and each baseboard management controller is defined as the preset baseboard management controller; and performing priority ranking on the preset baseboard management controllers in the set of preset baseboard management controllers, and generating the list of preset baseboard management controllers according to priorities from high to low.

In some embodiments, the acquiring, based on the preset data acquisition rule through the network file system server, data of the baseboard management controller that reports the error includes: traversing the list of preset baseboard management controllers; and selecting, according to a priority sequence of the preset baseboard management controllers, one preset baseboard management controller to acquire, based on the preset data acquisition rule of the baseboard management controller that reports the error through the network file system server, the data of the baseboard management controller that reports the error.

In some embodiments, the acquiring, based on the preset data acquisition rule through the network file system server, data of the baseboard management controller that reports the error further includes: in response to the data acquisition executive body being the cluster and the data acquisition mode being the continuous data acquisition mode, obtaining, by a preset baseboard management controller in the set of preset baseboard management controllers, a serial port resource occupancy rate of any preset baseboard management controller within the target wide area network except for the baseboard management controller that reports the error; and selecting a preset baseboard management controller with the smallest serial port resource occupancy rate to acquire, according to the continuous data acquisition mode, the data of the baseboard management controller that reports the error.

In some embodiments, the serial port data of the baseboard management controller that reports the error includes: a configuration partition, a log partition, an internal memory partition, a network routing parameter, a kernel resource parameter, resource occupancy information, and process thread operation information.

Figure 5:
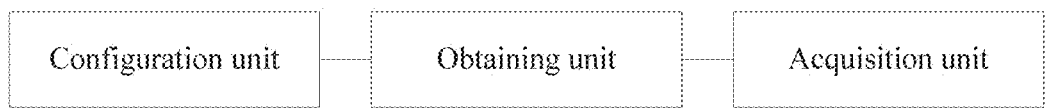
FIG. 5 is a structural block diagram of a data acquisition apparatus in one or more embodiments of the present application.

In some embodiments, as shown in FIG. 5, the present application provides a data acquisition apparatus. The apparatus includes:
a configuration unit, configured for configuring a server cluster and a network file system server to a target wide area network, where a quantity of the server cluster is at least one, and the server cluster includes a service server; and further configured for: broadcasting, by a baseboard management controller, serving as a target baseboard management controller, of any service server, a link layer discovery protocol data frame to the target wide area network, and receiving, by a baseboard management controller serving as a preset baseboard management controller in the target wide area network except for the target baseboard management controller, the link layer discovery protocol data frame broadcast by the target baseboard management controller, to achieve successful handshake communication of any two service servers;
an obtaining unit, configured for obtaining, in response to the baseboard management controller of any service server reporting an error, a preset data acquisition rule of the baseboard management controller that reports the error; and
an acquisition unit, configured for acquiring, based on the preset data acquisition rule through the network file system server, data of the baseboard management controller that reports the error.

In some embodiments, the configuration unit is further configured for: configuring a service server to a target local area network to generate the server cluster, where a quantity of the service server is at least one; and broadcasting, by a baseboard management controller, serving as a target baseboard management controller, of the service server, a link layer discovery protocol data frame to the target local area network, to achieve successful handshake communication of any two service servers.

In some embodiments, the obtaining unit is further configured for: parsing, by the baseboard management controller, the link layer discovery protocol data frame broadcast by the target baseboard management controller, and obtaining attribute information of the target baseboard management controller, where the attribute information includes: an IP address, a life cycle of the link layer discovery protocol data frame, and last time of receiving the link layer discovery protocol data frame of the target baseboard management controller; and generating a target baseboard management controller attribute information table based on the attribute information of the target baseboard management controller, and storing the target baseboard management controller attribute information table to a preset internal memory file.

In some embodiments, the apparatus further includes an update unit. The update unit is configured for: determining, based on the IP address in the attribute information of the target baseboard management controller, whether the preset internal memory file of the baseboard management controller includes an IP address that is consistent with the IP address; in response to the preset internal memory file including an IP address that is consistent with the IP address, updating, to the IP address, the last time of receiving the link layer discovery protocol data frame of the target baseboard management controller; and in response to the preset internal memory file not including an IP address that is consistent with the IP address, adding the attribute information of the target baseboard management controller to the preset internal memory file.

In some embodiments, the apparatus further includes a determining unit. The obtaining unit is further configured for: obtaining, by the baseboard management controller based on an IP address in the preset internal memory file, last time, corresponding to the IP address, of receiving the link layer discovery protocol data frame of the target baseboard management controller; and obtaining a time difference between current time and the last time of receiving the link layer discovery protocol data frame of the target baseboard management controller. The determining unit is configured for determining whether the time difference exceeds a life cycle, corresponding to the IP address, of the link layer discovery protocol data frame. In response to the time difference exceeding the life cycle, corresponding to the IP address, of the link layer discovery protocol data frame, the update unit is further configured for deleting the target baseboard management controller attribute information table.

In some embodiments, the obtaining unit is further configured for: reading the preset data acquisition rule of the baseboard management controller that reports the error from an electrically erasable programmable read-only memory of the baseboard management controller that reports the error; reading a network file system parameter configured to a network file system server of the baseboard management controller that reports the error; and acquiring, based on the preset data acquisition rule through the network file system server, the data of the baseboard management controller that reports the error. The data acquisition rule includes: a data acquisition executive body, a data acquisition manner and a data acquisition mode; the data acquisition executive body includes: a native machine and a cluster; the data acquisition manner includes: remote acquisition and local acquisition; and the data acquisition mode includes: a manual data acquisition mode, a continuous data acquisition mode, an intelligent data acquisition mode, and a control data acquisition mode.

In some embodiments, the determining unit is further configured for: determining whether a network state of the target wide area network is normal. In response to the network state of the target wide area network being normal, the acquisition unit is further configured for: acquiring, by using the preset data acquisition rule through the network file system server, the data of the baseboard management controller that reports the error; and in response to the network state of the target wide area network being abnormal, externally connecting a storage device to the baseboard management controller that reports the error, and determining, based on the determining unit, whether the data acquisition manner is local acquisition.

In some embodiments, in response to the determining unit determining that the data acquisition manner is local acquisition, whether the data acquisition executive body is the native machine is determined based on the determining unit;

and in response to the data acquisition manner being not local acquisition, by using the data acquisition rule that includes the data acquisition executive body being the native machine, the data acquisition manner being local acquisition, and the data acquisition mode being the manual data acquisition mode, the data of the baseboard management controller that reports the error is acquired.

In some embodiments, the acquisition unit is further configured for: in response to the data acquisition executive body being the native machine, acquiring, by using a preset data acquisition mode, the data of the baseboard management controller that reports the error; and in response to the data acquisition executive body being not the native machine, determining, based on the determining unit, whether a network state of the target local area network is normal.

In some embodiments, the acquisition unit is further configured for: in response to the network state of the target local area network being normal, acquiring, by using the preset data acquisition mode, the data of the baseboard management controller that reports the error; and in response to the network state of the target local area network being abnormal, obtaining the preset data acquisition mode, and acquiring, by using the data acquisition rule that includes the data acquisition executive body being the native machine, the data acquisition manner being local acquisition, and the data acquisition mode being the preset data acquisition mode, the data of the baseboard management controller that reports the error.

In some embodiments, the acquisition unit is further configured for: in response to the data acquisition executive body being the native machine, acquiring, according to the preset data acquisition mode by the baseboard management controller that reports the error, the data of the baseboard management controller that reports the error, and writing the data into the network file system server; and in response to the data acquisition executive body being the cluster, acquiring, by a preset baseboard management controller according to the preset data acquisition mode, the data of the baseboard management controller that reports the error, and writing the data into the network file system server.

In some embodiments, the acquisition unit is further configured for: in response to the data acquisition executive body being the cluster, acquiring, by a preset baseboard management controller according to the preset data acquisition mode, the data of the baseboard management controller that reports the error, and writing the data into the storage device; and in response to the data acquisition executive body being the native machine, acquiring, by the baseboard management controller that reports the error according to the preset data acquisition mode, the data of the baseboard management controller that reports the error, and writing the data into the storage device.

In some embodiments, the acquisition unit is further configured for executing following steps: Step A1, obtaining a data acquisition execution signal of the baseboard management controller that reports the error; Step A2, after the data acquisition execution signal of the baseboard management controller that reports the error has been obtained, obtaining the network file system parameter of the baseboard management controller that reports the error, and mounting, based on the network file system parameter of the baseboard management controller that reports the error, a path of the network file system server to the baseboard management controller that reports the error; Step A3, outputting serial port data of the baseboard management controller that reports the error to an asynchronous transceiver transmission end; and Step A4, obtaining, based on the asynchronous transceiver transmission end, the serial port data of the baseboard management controller that reports the error, and writing the serial port data into the network file system server.

In some embodiments, the acquisition unit is further configured for repeatedly executing Step A1 to Step A4, and acquiring the data of the baseboard management controller that reports the error.

In some embodiments, the acquisition unit is further configured for executing following steps: Step B1, obtaining a network file system configuration parameter of the baseboard management controller that reports the error; Step B2, mounting, based on the network file system configuration parameter, the network file system server to the baseboard management controller that reports the error; Step B3, determining whether a data acquisition execution instruction has been successfully received, where the execution instruction includes a data acquisition execution instruction sent by an IPM1, and a data acquisition execution instruction stored in the network file system server mounted to the baseboard management controller that reports the error; and Step B4, in response to the data acquisition execution instruction having been successfully received, executing the data acquisition execution instruction to generate an execution result, and writing the execution result into the network file system server, where the execution result includes an execution success and an execution failure.

In some embodiments, the acquisition unit is further configured for executing following steps: Step C1, reading a network file system configuration parameter of the baseboard management controller that reports the error; Step C2, mounting, based on the network file system configuration parameter of the baseboard management controller that reports the error, a corresponding catalog of the network file system server to the baseboard management controller that reports the error; Step C3, acquiring serial port data of the baseboard management controller that reports the error, and parsing the serial port data of the baseboard management controller that reports the error; Step C4, determining whether an abnormal operation state of the baseboard management controller that reports the error is true, and executing Step C5 in response to the abnormal operation state of the baseboard management controller that reports the error being true; and Step C5, saving the serial port data of the baseboard management controller that reports the error into a file corresponding to a mounting catalog configured in the network file system.

In some embodiments, the acquisition unit is further configured for executing following steps: in response to the abnormal operation state of the baseboard management controller that reports the error being false, executing Step C6; and Step C6, determining whether the baseboard management controller that reports the error has a process thread having a data acquisition demand.

In some embodiments, the acquisition unit is further configured for: in response to the baseboard management controller that reports the error not having the process thread with a data acquisition demand, executing Step C7; otherwise, executing Step C5; and Step C7, discarding the serial port data of the baseboard management controller that reports the error.

In some embodiments, the configuration unit is further configured for: generating a set of preset baseboard management controllers based on any target baseboard management controller, where the set of preset baseboard management controllers includes at least one baseboard management controller in the target wide area network except for the target baseboard management controller, and each baseboard management controller is defined as the preset baseboard management controller; and performing priority ranking on the preset baseboard management controllers in the set of preset baseboard management controllers, and generating the list of preset baseboard management controllers according to priorities from high to low.

In some embodiments, the acquisition unit is further configured for: traversing the list of preset baseboard management controllers; and selecting, according to a priority sequence of the preset baseboard management controllers, one preset baseboard management controller to acquire, based on the preset data acquisition rule of the baseboard management controller that reports the error through the network file system server, the data of the baseboard management controller that reports the error.

In some embodiments, the obtaining unit is further configured for: in response to the data acquisition executive body being the cluster and the data acquisition mode being the continuous data acquisition mode, obtaining, by a preset baseboard management controller in the set of preset baseboard management controllers, a serial port resource occupancy rate of any preset baseboard management controller within the target wide area network except for the baseboard management controller that reports the error; and selecting a preset baseboard management controller with the smallest serial port resource occupancy rate to acquire, according to the continuous data acquisition mode, the data of the baseboard management controller that reports the error. The serial port data of the baseboard management controller that reports the error includes: a configuration partition, a log partition, an internal memory partition, a network routing parameter, a kernel resource parameter, resource occupancy information, and process thread operation information.

The limitations on the data acquisition apparatus may be found in the limitations on the data acquisition method described above, and will not be elaborated here. The various modules in the data acquisition apparatus may be implemented entirely or partially through software, hardware, or a combination thereof. The above modules may be embedded in or independent of a processor in a computer device in a hardware form, or stored in a memory in the computer device in a software form, for the processor to invoke and execute the operations corresponding to the above modules.

Figure 6:
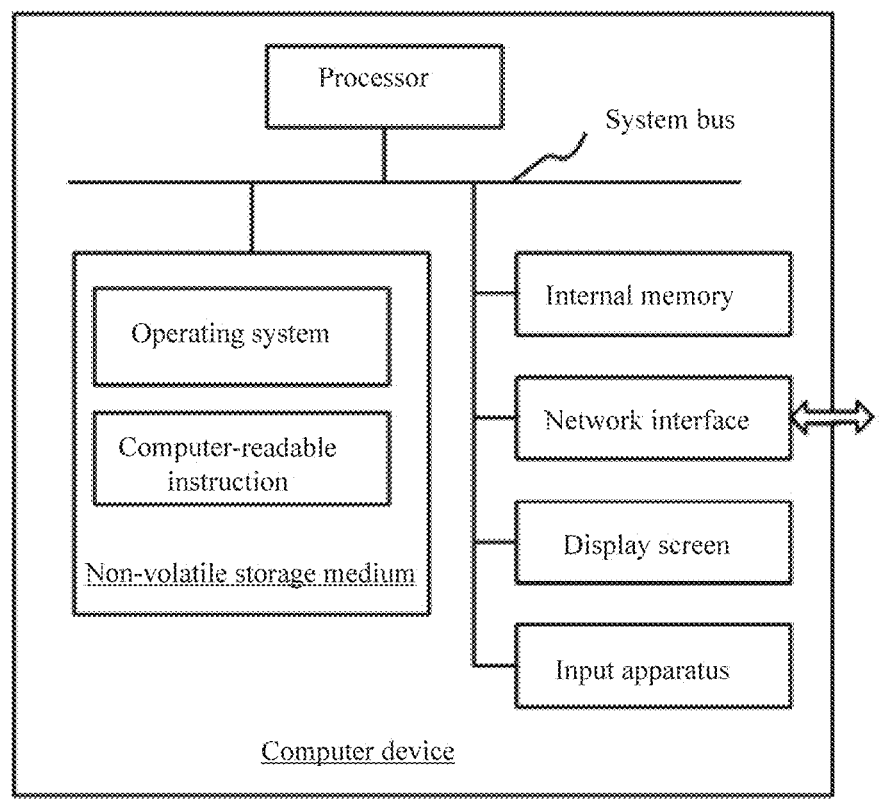
FIG. 6 is a diagram of an internal structure of a computer device in one or more embodiments of the present application.

In some embodiments, a computer device is provided. The computer device may be a terminal, a diagram of an internal structure of which may be as shown in FIG. 6. The computer device includes a processor, a memory, a network interface, a display screen, and an input apparatus which are connected through a system bus. The processor of the computer device is configured for providing computation and control abilities. The memory of the computer device includes a non-volatile storage medium and an internal memory. The non-volatile storage medium stores an operating system and computer-readable instructions. The internal memory provides an environment for running the operating system and the computer-readable instructions in the non-volatile storage medium. The network interface of the computer device is configured for communicating with an external terminal through network connection. The computer-readable instructions, when executed by one or more processors, implement a data acquisition method. The display screen of the computer device may be a liquid crystal display screen or an e-ink display screen. The input apparatus of the computer device may be a touch layer covering the display screen, or may be a button, a trackball, or a touchpad arranged on a housing of the computer device, or may be an external keyboard, touchpad, a mouse or the like.

A person skilled in the art may understand that, the structure shown in FIG. 6 is merely a block diagram of partial structures related to a solution in the present application, and does not constitute a limitation on the computer device to which the solution of the present application is applied. In some embodiments, the computer device may include more components or fewer components than those shown in the figure, or some components may be combined, or a different component deployment may be used.

In some embodiments, a computer device is provided, including one or more memories, one or more processors, and computer-readable instructions stored on the one or more memories and executable on the one or more processors. The one or more processors, when executing the computer-readable instructions, implement the steps of the data acquisition method provided in any of the above embodiments.

In some embodiments, a computer-readable storage medium is provided, having computer-readable instructions stored thereon. The computer-readable instructions, when executed by a processor, implement the steps of the data acquisition method provided in any of the above embodiments.

In some embodiments, the computer-readable instructions, when executed by one or more processors, implement following steps:

configuring a server cluster and a network file system server to a target wide area network, where a quantity of the server cluster is at least one, and the server cluster includes a service server;

broadcasting, by a baseboard management controller, serving as a target baseboard management controller, of any service server, a link layer discovery protocol data frame to the target wide area network, and receiving, by a baseboard management controller serving as a preset baseboard management controller in the target wide area network except for the target baseboard management controller, the link layer discovery protocol data frame broadcast by the target baseboard management controller, to achieve successful handshake communication of any two service servers;

obtaining, in response to the baseboard management controller of any service server reporting an error, a preset data acquisition rule of the baseboard management controller that reports the error; and acquiring, based on the preset data acquisition rule through the network file system server, data of the baseboard management controller that reports the error.

A person of ordinary skill in the art may understand that all or some of the procedures of the method in the foregoing embodiments may be implemented by the computer-readable instructions that instruct relevant hardware. The computer-readable instructions may be stored in a non-volatile computer-readable storage medium. When the computer-readable instructions are executed, the procedures of the foregoing method embodiments may be implemented. Any reference to the memory, the database, or other media used in the embodiments provided in the present application may include a non-volatile memory and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an explanation rather than limitation, the RAM may be obtained in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus direct RAM (RDRAM), a direct memory bus dynamic RAM (DRDRAM), and a memory bus dynamic RAM (RDRAM).

All the technical features of the above embodiments may be combined randomly. For the sake of brevity, all possible combinations of all the technical features in the above embodiments are not described. However, these technical features shall all be considered to fall within the scope of this specification as long as there is no contradiction in their combinations.

The foregoing embodiments merely express several implementations of the present application. The descriptions thereof are relatively specific and detailed, but are not understood as limitations on the scope of the patent of the application. A person of ordinary skill in the art may also make several transformations and improvements without departing from the idea of the present application. These transformations and improvements fall within the protection scope of the present application. Therefore, the protection scope of the patent of the present application shall be subject to the appended claims.

The invention claimed is:

1. A data acquisition method, comprising:
configuring a server cluster and a network file system server to a target wide area network, wherein the server cluster comprises a service server;
broadcasting, by a baseboard management controller, serving as a target baseboard management controller, of any service server, a link layer discovery protocol data frame to the target wide area network, and receiving, by a baseboard management controller serving as a preset baseboard management controller in the target wide area network except for the target baseboard management controller, the link layer discovery protocol data frame broadcast by the target baseboard management controller, to achieve successful handshake communication of any two service servers;
in response to the baseboard management controller of any service server within the target wide area network reporting an error, sending error information to the baseboard management controller of any service server through the target wide area network;
after receiving the error information, initiating, by the baseboard management controller of any service server, a diagnostic data remote-acquisition process, and obtaining a preset data acquisition rule of the baseboard management controller that reports the error; and
acquiring, based on the preset data acquisition rule through the network file system server, data of the baseboard management controller that reports the error.

2. The data acquisition method according to claim 1, wherein before the configuring a server cluster and a network file system server to a target wide area network, the method further comprises:
configuring a service server to a target local area network to generate the server cluster; and
broadcasting, by a baseboard management controller, serving as a target baseboard management controller, of the service server, a link layer discovery protocol data frame to the target local area network, to achieve successful handshake communication of any two service servers.

3. The data acquisition method according to claim 1, wherein the acquiring, based on the preset data acquisition rule through the network file system server, data of the baseboard management controller that reports the error comprises:
reading the preset data acquisition rule of the baseboard management controller that reports the error from an electrically erasable programmable read-only memory of the baseboard management controller that reports the error;
reading a network file system parameter configured to a network file system server of the baseboard management controller that reports the error; and
based on the preset data acquisition rule and the network file system parameter of the network file system server of the baseboard management controller that reports the error, acquiring, through the network file system server, the data of the baseboard management controller that reports the error.

4. The data acquisition method according to claim 3, wherein in response to the preset data acquisition rule in the electrically erasable programmable read-only memory being effective, the acquiring, based on the preset data acquisition rule through the network file system server, data of the baseboard management controller that reports the error comprises:
determining whether a first network state of the target wide area network is normal;
in response to the first network state of the target wide area network being normal, acquiring, by using the preset data acquisition rule through the network file system server, the data of the baseboard management controller that reports the error; and
in response to the first network state of the target wide area network being abnormal, externally connecting a storage device to the baseboard management controller that reports the error, and determining whether a data acquisition manner of the preset data acquisition rule is local acquisition.

5. The data acquisition method according to claim 4, wherein the determining whether a data acquisition manner is local acquisition comprises:
in response to the data acquisition manner being the local acquisition, determining whether a data acquisition executive body of the preset data acquisition rule is a native machine; and
in response to the data acquisition manner being not the local acquisition, acquiring, by using the preset data acquisition rule that comprises the data acquisition executive body being the native machine, the data acquisition manner being the local acquisition, and a data acquisition mode of the preset data acquisition rule being a manual data acquisition mode, the data of the baseboard management controller that reports the error.

6. The data acquisition method according to claim 5, wherein the determining whether a data acquisition executive body of the preset data acquisition rule is a native machine comprises:
in response to the data acquisition executive body being the native machine, acquiring, by using a preset data acquisition mode, the data of the baseboard management controller that reports the error; and in response to the data acquisition executive body being not the native machine, determining whether a second network state of a target local area network is normal.

7. The data acquisition method according to claim 6, wherein the determining whether a second network state of the target local area network is normal comprises:
- in response to the second network state of the target local area network being normal, acquiring, by using the preset data acquisition mode, the data of the baseboard management controller that reports the error; and
- in response to the second network state of the target local area network being abnormal, obtaining the preset data acquisition mode, and acquiring, by using the preset data acquisition rule that comprises the data acquisition executive body being the native machine, the data acquisition manner being the local acquisition, and the data acquisition mode being the preset data acquisition mode, the data of the baseboard management controller that reports the error.

8. The data acquisition method according to claim 4, wherein in response to the data acquisition manner being the local acquisition, the method further comprises:
- in response to a data acquisition executive body of preset data acquisition rule being a cluster, acquiring, by a preset baseboard management controller according to a preset data acquisition mode, the data of the baseboard management controller that reports the error, and writing the data into the storage device; and
- in response to the data acquisition executive body being a native machine, acquiring, according to the preset data acquisition mode by the baseboard management controller that reports the error, the data of the baseboard management controller that reports the error, and writing the data into the storage device.

9. The data acquisition method according to claim 3, wherein in response to a data acquisition manner of the preset data acquisition rule being remote acquisition, the method further comprises:
- in response to a data acquisition executive body of the preset data acquisition rule being a native machine, acquiring, according to a preset data acquisition mode by the baseboard management controller that reports the error, the data of the baseboard management controller that reports the error, and writing the data into the network file system server; and
- in response to the data acquisition executive body being a cluster, acquiring, by a preset baseboard management controller according to the preset data acquisition mode, the data of the baseboard management controller that reports the error, and writing the data into the network file system server.

10. The data acquisition method according to claim 9, wherein in response to the preset data acquisition mode being a manual data acquisition mode, the method comprises following steps:
- Step A1, obtaining a data acquisition execution signal of the baseboard management controller that reports the error;
- Step A2, after the data acquisition execution signal of the baseboard management controller that reports the error has been obtained, obtaining the network file system parameter of the baseboard management controller that reports the error, and mounting, based on the network file system parameter of the baseboard management controller that reports the error, a path of the network file system server to the baseboard management controller that reports the error;
- Step A3, outputting serial port data of the baseboard management controller that reports the error to an asynchronous transceiver transmission end; and
- Step A4, obtaining, based on the asynchronous transceiver transmission end, the serial port data of the baseboard management controller that reports the error, and writing the serial port data into the network file system server.

11. The data acquisition method according to claim 10, wherein the serial port data of the baseboard management controller that reports the error comprises: a configuration partition, a log partition, an internal memory partition, a network routing parameter, a kernel resource parameter, resource occupancy information, and process operation information.

12. The data acquisition method according to claim 9, wherein in response to the preset data acquisition mode being a control data acquisition mode, the method comprises following steps:
- Step B1, obtaining a network file system configuration parameter of the baseboard management controller that reports the error;
- Step B2, mounting, based on the network file system configuration parameter, the network file system server to the baseboard management controller that reports the error;
- Step B3, determining whether a data acquisition execution instruction has been successfully received, wherein the data acquisition execution instruction comprises a data acquisition execution instruction sent by an Intelligent Platform Management Interface (IPM1), and a data acquisition execution instruction stored in the network file system server mounted to the baseboard management controller that reports the error; and
- Step B4, in response to the data acquisition execution instruction having been successfully received, executing the data acquisition execution instruction to generate an execution result, and writing the execution result into the network file system server, wherein the execution result comprises an execution success and an execution failure.

13. The data acquisition method according to claim 9, wherein in response to the preset data acquisition mode being an intelligent data acquisition mode, the method comprises:
- Step C1, reading a network file system configuration parameter of the baseboard management controller that reports the error;
- Step C2, mounting, based on the network file system configuration parameter of the baseboard management controller that reports the error, a corresponding catalog of the network file system server to the baseboard management controller that reports the error;
- Step C3, acquiring serial port data of the baseboard management controller that reports the error, and parsing the serial port data of the baseboard management controller that reports the error;
- Step C4, determining whether an abnormal operation state of the baseboard management controller that reports the error is true, and executing Step C5 in response to the abnormal operation state of the baseboard management controller that reports the error being true; and
- Step C5, saving the serial port data of the baseboard management controller that reports the error into a file corresponding to a mounting catalog configured in the network file system server.

14. The data acquisition method according to claim 13, wherein the determining whether an abnormal operation state of the baseboard management controller that reports the error is true comprises:
  in response to the abnormal operation state of the baseboard management controller that reports the error being false, executing Step C6; and
  Step C6, determining whether the baseboard management controller that reports the error has a process with a data acquisition demand.

15. The data acquisition method according to claim 14, wherein the determining whether the baseboard management controller that reports the error has a process with a data acquisition demand comprises:
  in response to the baseboard management controller that reports the error not having the process with the data acquisition demand, executing Step C7;
  in response to the baseboard management controller that reports the error having the process with the data acquisition demand, executing Step C5; and
  Step C7, discarding the serial port data of the baseboard management controller that reports the error.

16. The data acquisition method according to claim 15, wherein the acquiring, based on the preset data acquisition rule through the network file system server, data of the baseboard management controller that reports the error further comprises:
  in response to the data acquisition executive body being the cluster and a data acquisition mode of the preset data acquisition rule being a continuous data acquisition mode, obtaining, by a preset baseboard management controller in a set of preset baseboard management controllers, a serial port resource occupancy rate of any preset baseboard management controller within the target wide area network except for the baseboard management controller that reports the error; and
  selecting a preset baseboard management controller with a smallest serial port resource occupancy rate to acquire, according to the continuous data acquisition mode, the data of the baseboard management controller that reports the error.

17. The data acquisition method according to claim 9, wherein the method comprises: generating a list of preset baseboard management controllers in advance; and
  the generating a list of preset baseboard management controllers in advance comprises:
    generating a set of preset baseboard management controllers based on any target baseboard management controller, wherein the set of preset baseboard management controllers comprises at least one baseboard management controller in the target wide area network except for the target baseboard management controller, and each baseboard management controller is defined as the preset baseboard management controller; and
    performing priority ranking on the preset baseboard management controllers in the set of preset baseboard management controllers, and generating the list of preset baseboard management controllers according to priorities from high to low.

18. The data acquisition method according to claim 17, wherein the acquiring, based on the preset data acquisition rule through the network file system server, data of the baseboard management controller that reports the error comprises:
  traversing the list of preset baseboard management controllers; and selecting, according to a priority sequence of the preset baseboard management controllers, one preset baseboard management controller to acquire, based on the preset data acquisition rule of the baseboard management controller that reports the error through the network file system server, the data of the baseboard management controller that reports the error.

19. A computer device, comprising a memory, and a processor, wherein a computer program is stored in the memory, and the processor, when executing the computer program, implement steps of:
  configuring a server cluster and a network file system server to a target wide area network, wherein the server cluster comprises a service server;
  broadcasting, by a baseboard management controller, serving as a target baseboard management controller, of any service server, a link layer discovery protocol data frame to the target wide area network, and receiving, by a baseboard management controller serving as a preset baseboard management controller in the target wide area network except for the target baseboard management controller, the link layer discovery protocol data frame broadcast by the target baseboard management controller, to achieve successful handshake communication of any two service servers;
  in response to the baseboard management controller of any service server within the target wide area network reporting an error, sending error information to the baseboard management controller of any service server through the target wide area network;
  after receiving the error information, initiating, by the baseboard management controller of any service server, a diagnostic data remote-acquisition process, and obtaining preset data acquisition rule of the baseboard management controller that reports the error; and
  acquiring, based on the preset data acquisition rule through the network file system server, data of the baseboard management controller that reports the error.

* * * * *